E. RIVETT.
POWER TRANSMISSION FOR GRINDING AND SIMILAR MACHINES.
APPLICATION FILED JAN. 12, 1917.
1,302,222.
Patented Apr. 29, 1919.
2 SHEETS—SHEET 1.
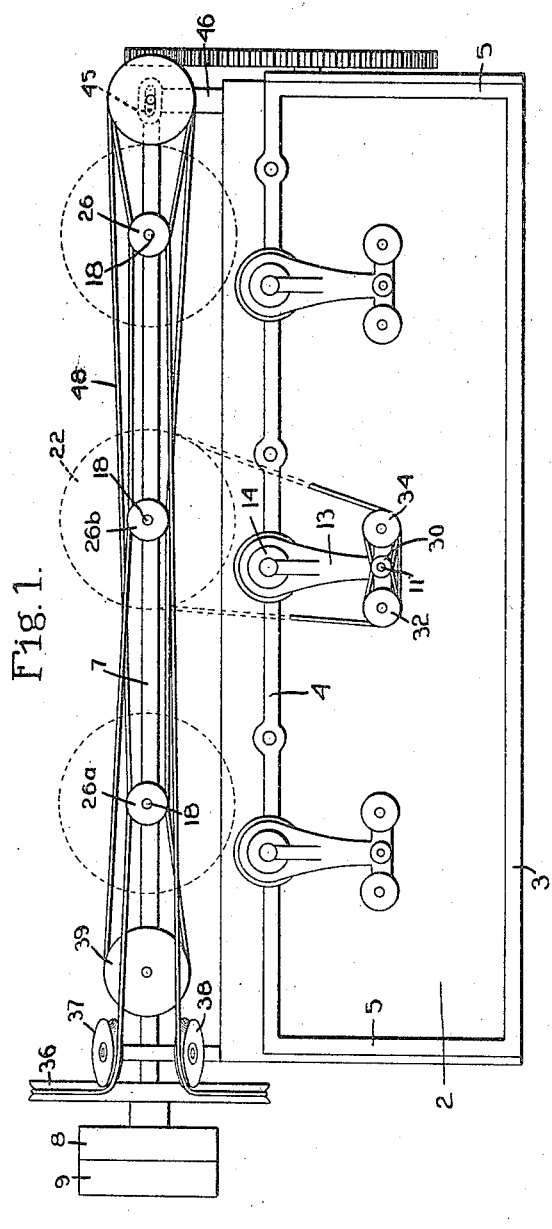
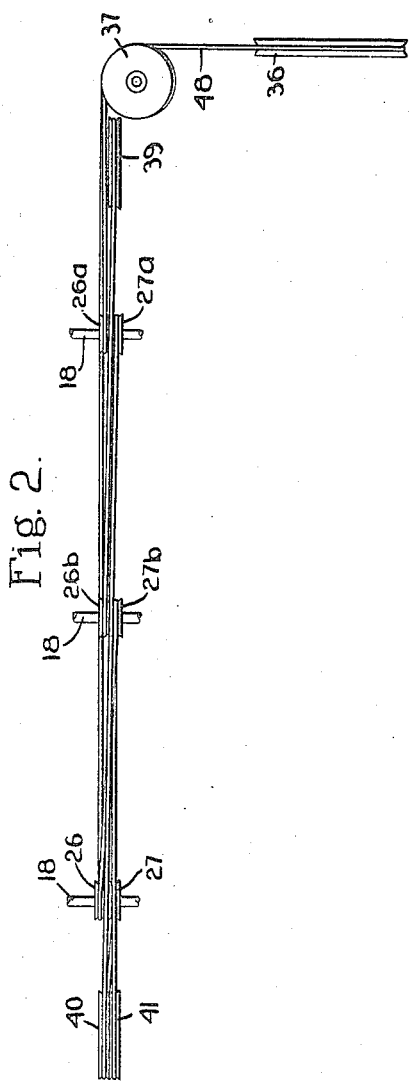
Inventor.
Edward Rivett
by Heard Smith & Tennant.
Attys.

E. RIVETT.
POWER TRANSMISSION FOR GRINDING AND SIMILAR MACHINES.
APPLICATION FILED JAN. 12, 1917.
1,302,222.
Patented Apr. 29, 1919.
2 SHEETS—SHEET 2.
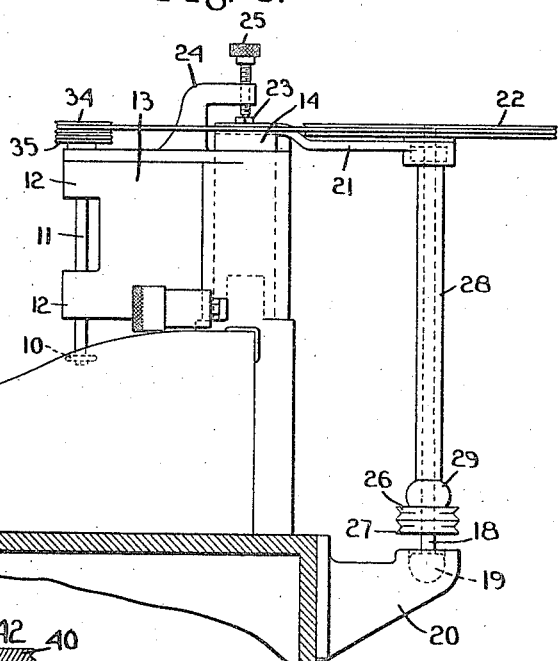
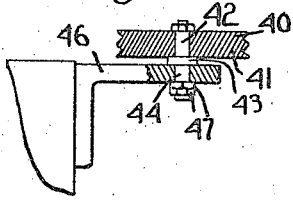
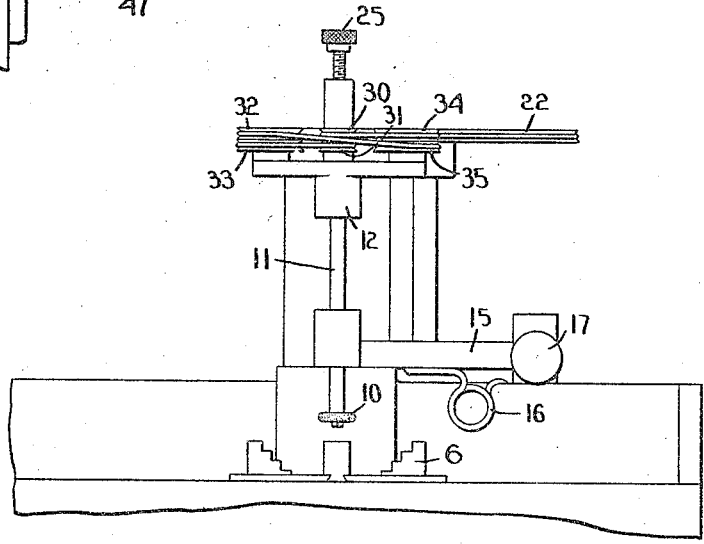
Inventor.
Edward Rivett
by Heard Smith & Tennant.
Attys

UNITED STATES PATENT OFFICE.

EDWARD RIVETT, OF HULL, MASSACHUSETTS.

POWER TRANSMISSION FOR GRINDING AND SIMILAR MACHINES.

1,302,222.        Specification of Letters Patent.    Patented Apr. 29, 1919.

Original application filed March 29, 1916, Serial No. 87,607. Divided and this application filed January 12, 1917. Serial No. 142,087.

*To all whom it may concern:*

Be it known that I, EDWARD RIVETT, a citizen of the United States, residing at Hull, county of Plymouth, State of Massachusetts, have invented an Improvement in Power Transmissions for Grinding and Similar Machines, of which the following description, in connection with the accompanying drawing, is a specification, like characters on the drawing representing like parts.

This invention relates to a novel means for securing the transmission of power in grinding or similar metal working machines. One object of the invention is to provide a power transmission drive from a driven pulley to a rotary grinding or other tool by means of an endless belt with the belt so arranged that its radial thrust on the spindle of the grinding or other tool is balanced thus preventing any deflection or binding of the spindle while at the same time the belt substantially encircles the grinding spindle enabling the spindle to be run at a very high speed with a comparatively small and light belt.

Another object of the invention is to provide a power transmission drive of similar character from a main driving pulley to a plurality of pulleys such, for example, as effect the rotation of a plurality of driver spindles for a grinding or other machine having a plurality of units; and to secure this power transmission by an endless belt so arranged that its radial thrust on each of the driver spindles is balanced thus preventing any deflection or binding of the spindles while at the same time the belt substantially encircles the pulleys on the driver spindles thus insuring a large and effective driving pull and enabling these spindles to be run at a very high speed with a comparatively small and light belt.

These and other objects and features of the invention will be more fully set forth in the accompanying description and drawings and defined by the claims.

The present invention is disclosed in my Patent No. 1,288,998, granted December 24, 1918, and the present application is a division of the application on which said patent is based.

The drawings illustrate a grinding machine made up of three similar grinding units. The novel features of this machine and its details of construction are fully set forth in my aforesaid patent and it is unnecessary here to describe them in detail because the present invention is directed solely to the power transmission, first, from the main driving pulley to the plurality of driver spindles one for each unit, and second, from each driver spindle to its corresponding grinder spindle. The drawings illustrate a preferred form of the present invention embodied in this grinding machine.

In the drawings,

Figure 1 is a top plan view of a grinding machine having three grinding units and embodying the present invention;

Fig. 2 is a rear elevation showing simply the main driving pulley, the endless belt, and the various pulleys and idlers by which power is transmitted to the driver spindles;

Fig. 3 is an end elevation partially in vertical cross section of the upper portion of the grinding machine;

Fig. 4 is a detail in end elevation showing one of the idlers for the main power transmission drive and its adjustable connection to the frame of the machine;

Fig. 5 is a front elevation of the construction shown in Fig. 3.

The grinding machine herein illustrated and fully disclosed in my aforesaid patent is shown as comprising three grinding units although it will be obvious that the invention is not limited in its broader aspects to the particular number of grinding units employed nor is the invention in fact limited to the particular tools or devices which are operated or driven by the spindles.

The power transmission drive of this invention is particularly designed for use in connection with such a machine where it is necessary to have a very high rate of speed in the grinder spindle and where the extreme accuracy of the work being performed requires that the spindle shall be driven with extreme accuracy and shall not become loose in its bearings or wabble or vibrate.

The grinding machine illustrated comprises a lower section 1 and an upper section. This upper section presents the generally horizontal bed 2 and the surrounding front wall 3, back wall 4 and side walls 5. In this bed are mounted and rotate the chucks 6.

A main shaft 7 is suitably journaled and extends horizontally at the rear of the machine frame. Fast and loose pulleys 8 and 9 mounted at one end of this shaft are illustrated as suitable means by which the said shaft may be connected to and driven from the line of shafting, motor, or other source of power. From this main shaft all the working parts of the machine including its several units are operated.

The machine illustrated comprises a plurality of operated grinding units each similar in its construction and operation. Each unit comprises a chuck 6 and a grinding tool 10.

In the construction illustrated the grinding tool 10 is carried by a spindle 11 journaled in bearings 12 in the forward end of a swinging head 13 pivotally mounted on a large vertical bearing stud 14. Angular adjustment of the swinging head to secure a transverse adjustment and feeding movement of the grinding tool is secured through the medium of an arm 15 projecting laterally from the head, the operation and adjustment of which is secured by suitable devices including the spring 16 and the micrometer screw 17 all of which are more fully described in my aforesaid patent.

Each grinding tool is rotated by an endless belt connection with a driver spindle arranged in the rear of the machine opposite the swinging head. Each driver spindle 18 is provided at its lower end with a ball 19 mounted in a socket in a bracket 20 projecting from the upper section of the machine frame. At its upper end each driver spindle is journaled in an arm 21 and is provided with a large pulley 22. The arm 21 extends into a slotted guideway at the top of the bearing stud 14 and is locked in place by the nut 23 so that the driver spindle may be swung slightly toward or from the bearing stud to tighten or loosen the driving belt. The swinging head 13 is provided with a bracket 24 at its upper end extending over the bearing stud and a set screw 25 passing through the bracket 24 bears upon the nut 23 and by means of this set screw 25 the swinging head may be vertically adjusted.

The driver spindle 18 is provided at its lower end with a pair of small pulleys or a double grooved pulley 26 and 27. A tubular casing 28 surrounds the driver spindle 18 between the pulley 22 and the pulley 26, has a ball and socket connection with the arm 21 and an enlargement 29 at its lower end abutting the pulley 26 and thus providing for lubrication.

The grinder spindle is provided at its upper end with a pair of grooved pulleys or a double grooved pulley 30 and 31. The swinging head is provided at each side of the grinder spindle with short vertical studs upon each of which is mounted a pair of idler pulleys 32, 33, 34 and 35. A belt extends from the pulley 22, around the idler 34, around the pulley 30, back around the idler 35, across to and around the idler 32, back around the pulley 31, and then around the idler 33 back around the pulley 22. Thus the belt is in contact with an equal extent of the periphery of the grinder spindle pulley opposite each idler pulley or set of idler pulleys. By arranging the belt drive in this manner there is no tendency to cause the drive to throw the grinder spindle out of alinement because the force exerted by the belt radially of the spindle is balanced. Furthermore, by this arrangement a single endless belt is employed for each grinder unit, and any slack in this belt is readily taken up at one time by adjusting the arm 21.

The several driver spindles are also in the preferred form of this invention simultaneously driven by a single endless belt from the main shaft of the machine and the arrangement is such as to secure a similar balancing of the forces exerted by the belt on each driver spindle so that in the case of each spindle there is no tendency of the belt to throw the spindle out of alinement. This drive as arranged for driving three units is illustrated in the preferred form in Figs. 1 and 2 of the drawings.

The pair of small pulleys or the double grooved pulley on the driver spindle at the right of the machine is shown as 26 and 27, at the middle as $26^b$ and $27^b$ and at the left as $26^a$ and $27^a$. These are driven pulleys and act to drive the driver spindles. The endless belt is driven from a main pulley 36 secured to the main shaft 7 and as this shaft is horizontally arranged a pair of horizontally deflecting pulleys 37, 38 are employed to deflect the belt from a vertical to a horizontal run. Idler pulleys are also vertically mounted and located at each end of the row of the driver spindle driver pulleys. The idler pulley 39 adjacent the main pulley 36 requires but one groove while the idler pulley at the opposite end has the double groove 40, 41. Provision is made for controlling the slack in the endless belt and this is secured in the construction illustrated by making this idler pulley 40, 41 adjustable longitudinally of the machine. For this purpose this pulley is shown as journaled on a stud 42 shouldered at 43 and having a threaded spindle 44 projecting through the slot 45 in the bracket 46. Suitable lock nuts 47 enable the pulley to be set at any point in the slot.

The driving belt 48 leads from the main pulley 36 over the deflecting pulley 37 around the pulley $26^a$, back around the idler pulley 39, then around the pulley $26^b$, then back around the pulley $27^a$, then around the idler 40, then back around the pulley 27, then around the idler 41, then back around the pulley $27^b$, then around pulley 26, and then back over the deflecting pulley 38 to the main pulley 36.

The arrangement of the pulleys and the driving belt has thus been described with respect to a machine provided with three units, but its application to a machine provided with a greater number or with but two will be apparent to a skilled mechanic. It will be observed that this disposition of the belt causes the strain of the drive to be balanced upon each driver spindle, thus preventing any interference with the alinement of the spindle and eliminating any tendency to binding due to the drive.

It will thus be seen that the drive for each grinder spindle has similar characteristics to the driver from the main shaft to the several units of the machine. In each case the arrangement is such that the double engagement of the belt with the driving pulley insures a substantial encircling of the driven pulley by the belt.

The idler pulleys employed to guide the endless belt twice about the driven pulley are relatively small so that the belt substantially encircles the driven pulley. A relatively small belt may thus be employed which is necessary when very high belt speed is desired as in grinding machines and this feature of the invention enables this high speed to be effectively attained.

Having fully described my invention, what I claim as new and desire to secure by Letters Patent is:

1. A metal working machine comprising a plurality of laterally movable vertical tool spindles, a corresponding plurality of vertical driver spindles, a main shaft, an endless belt drive from each driver spindle to its tool spindle acting to drive said spindle in various positions of lateral adjustment, and a single endless belt drive from the main shaft to all of the driver spindles.

2. A metal working machine comprising a plurality of vertical tool spindles, a corresponding plurality of vertical driver spindles, a main shaft, an endless belt drive from each driver spindle to its tool spindle, a single endless belt drive from the main shaft to all of the driver spindles, and means for guiding each endless belt from each driver spindle to its tool spindle to balance the strain of the belt upon each spindle, thus to prevent deflection or binding of each spindle by the belt.

3. A grinding machine comprising a row of three vertical grinder spindles, a main shaft, a main pulley driven thereby, a row of three vertical driver spindles one for each grinder spindle, a double grooved driven pulley on and for driving each driver spindle, a pair of idler pulleys vertically mounted one at each end of the row of said driving pulleys, the idler pulley at the end opposite the main pulley being double grooved, driving connections between each driver spindle and its grinder spindle, and an endless belt leading from the main pulley around the first driven pulley, back around the first idler pulley, around the second driven pulley, back around the first driven pulley, around the last idler pulley, back around the third driven pulley, around the last idler pulley, back around the second driven pulley, around the third driven pulley and back to the main pulley, whereby the said driver spindles are driven from the main shaft by a single endless belt, and the strain of the belt upon each driver spindle is balanced.

4. A metal working machine comprising a plurality of vertical tool spindles, a corresponding plurality of vertical driver spindles, means for driving each tool spindle from its corresponding driver spindle, a main shaft, a single endless belt drive from the main shaft to all of the driver spindles, and means for guiding said belt to balance the strain of the belt upon each driver spindle thus to prevent deflection or binding of the said spindles by the belt.

5. A metal working machine comprising a plurality of vertical tool spindles in a row, a corresponding plurality of vertical driver spindles in a row, means for driving each tool spindle from its corresponding driver spindle, a main shaft, a pulley thereon and driven thereby, pulleys on and for driving each of said driver spindles, a pair of idler pulleys one at each end of the row of driver spindle pulleys, and an endless belt passing about all of said pulleys, and acting to drive the driver spindles with the strain of the belt balanced with respect to each driver spindle, thus to prevent deflection or binding of each of said spindles.

6. A metal working machine comprising a tool spindle, a pulley on said tool spindle, a pair of idler pulleys located at opposite sides of the tool spindle, an actuating pulley and an endless belt leading from the actuating pulley around one idler, thence around the spindle pulley, thence back around said idler, thence around the second idler, thence around the spindle pulley, thence back around the second idler, thence to the actuating pulley, whereby the strain of the belt on the spindle is balanced and the driving pull of the spindle increased.

7. A metal working machine comprising a tool spindle, a double grooved pulley on said tool spindle, a pair of double grooved idler pulleys located at opposite sides of the tool spindle, an actuating pulley and an endless belt leading from the actuating pulley around one idler, thence around the spindle pulley, thence back around said idler, thence around the second idler, thence around the spindle pulley, thence back around the second idler, thence to the actuating pulley, whereby the strain of the belt on the spindle is balanced and the driving pull on the spindle increased.

8. A metal working machine comprising a tool spindle, a pulley on said tool spindle, a pair of idler pulleys located at opposite sides of the tool spindle, an actuating pulley, and an endless belt extending about all of said pulleys, in contact with an equal extent of the periphery of the spindle pulley opposite each idler pulley, substantially surrounding the spindle pulley to give large driving pull thereto, and having its radial strains on the spindle balanced.

9. A metal working machine comprising a tool spindle, a small pulley on said tool spindle, a pair of small idler pulleys located at opposite sides of the tool spindle, a relatively large actuating pulley and an endless belt leading from the actuating pulley around one idler, thence around the spindle pulley, thence back around said idler, thence around the second idler, thence around the spindle pulley, thence back around the second idler, thence to the actuating pulley, whereby the strain of the belt on the spindle is balanced, the driving pull on the spindle is large, and high spindle speed may be attained with a relatively small belt.

In testimony whereof I have signed my name to this specification.

EDWARD RIVETT.

Copies of this patent may be obtained for five cents each, by addressing the "Commissioner of Patents, Washington, D. C."

It is hereby certified that in Letters Patent No. 1,302,222, granted April 29, 1919, upon the application of Edward Rivett, of Hull, Massachusetts, for an improvement in "Power Transmissions for Grinding and Similar Machines," errors appear in the printed specification requiring correction as follows: Page 3, line 56, claim 3, for the word "grinding" read *metal working;* same page and claim, lines 57, 60, and 67, for the word "grinder" read *tool;* and that the said Letters Patent should be read with these corrections therein that the same may conform to the record of the case in the Patent Office.

Signed and sealed this 27th day of May, A. D., 1919.

[SEAL.]

R. F. WHITEHEAD,

*Acting Commissioner of Patents.*

Cl. 74—21.